United States Patent
Helfer et al.

(10) Patent No.: US 8,311,909 B2
(45) Date of Patent: Nov. 13, 2012

(54) METHODS AND SYSTEMS FOR CASE BUDGETING AND EXPENSE REDUCTION

(75) Inventors: Michael Helfer, New York, NY (US); Michael T. Heyrich, Madison, NJ (US); Maria M. Zulaica, Tampa, FL (US)

(73) Assignee: Citibank, N.A., New York, NY (US)

( * ) Notice: Subject to any disclaimer, the term of this patent is extended or adjusted under 35 U.S.C. 154(b) by 1129 days.

(21) Appl. No.: 11/592,089

(22) Filed: Nov. 2, 2006

(65) Prior Publication Data

US 2007/0214082 A1      Sep. 13, 2007

Related U.S. Application Data

(60) Provisional application No. 60/732,867, filed on Nov. 2, 2005.

(51) Int. Cl.
*G06F 15/02* (2006.01)
(52) U.S. Cl. .................. 705/32; 705/30; 705/34; 705/40
(58) Field of Classification Search .................... 705/30, 705/32
See application file for complete search history.

(56) References Cited

U.S. PATENT DOCUMENTS

| | | | |
|---|---|---|---|
| 6,622,128 B1 * | 9/2003 | Bedell et al. | 705/30 |
| 2001/0034675 A1 * | 10/2001 | Belford et al. | 705/30 |
| 2002/0002469 A1 * | 1/2002 | Hillstrom | 705/1 |
| 2004/0064389 A1 | 4/2004 | Force et al. | 705/34 |
| 2005/0177476 A1 * | 8/2005 | McCandless et al. | 705/32 |
| 2005/0203814 A1 * | 9/2005 | Derry et al. | 705/30 |

FOREIGN PATENT DOCUMENTS

WO   WO 01/82180   * 11/2001

* cited by examiner

*Primary Examiner* — Sarah Monfeldt
(74) *Attorney, Agent, or Firm* — Johnson, Marcou & Isaacs, LLC; John M. Harrington (57) ABSTRACT

A method and system for managing legal fees and minimizing costs of an organization involves periodically receiving case budget information consisting at least in part of identification, billing rate, and hours for each person projected to work on a legal project for the organization. The case budget information is received by internal counsel for the organization from external counsel via entry of the information on a template provided by internal counsel and uploaded to an internal matter management system of the organization if approved by internal counsel. At the end of each billing cycle, current bill data from external counsel is also uploaded to the internal matter management system of the organization, and the current bill data is compared with the case budget information. A report is generated flagging any discrepancies between the current bill data and the case budget information.

21 Claims, 5 Drawing Sheets

Matter Budget Format

SAMPLE BUDGET SPREADSHEET -- MONTH, YEAR

| | NAME<br>PARTNER A | | NAME<br>PARTNER B | | NAME<br>ASSOCIATE C | | NAME<br>ASSOCIATE D | | NAME<br>LEGAL ASST E | | TOTAL COST | | TOTAL HOURS | |
|---|---|---|---|---|---|---|---|---|---|---|---|---|---|---|
| | HOURS | RATE | HOURS | RATE | HOURS | RATE | HOURS | RATE | HOURS | RATE | MONTH | CASE | MONTH | CASE |
| | 5 | 500 | 30 | 450 | 35 | 300 | 85 | 250 | 100 | 125 | | | | |
| Deposition X | 5 | | 15 | | 80 | | 45 | | 50 | | 25,500 | | | |
| Deposition Y | 1 | | 5 | | 10 | | 20 | | 10 | | 27,000 | | | |
| Document Production | | | | | | | | | | | 46,500 | | | |
| Work on Motion for Summary Judgment | 40 | | 10 | | 30 | | 25 | | 10 | | 43,750 | | | |
| | | | | | | | | | | | 21,250 | | | |
| TOTAL COST, MONTH | | | | | | | | | | | 164,000 | | | |
| TOTAL HOURS, MONTH | 51 | | 60 | | 155 | | 175 | | 170 | | | | | 611 |

| CitiLawFirm TaxID | CitiLawFirm SiteCode | CitiLawFirmName | CitiMatterNumber | LawFirmMatter Number | TimekeeperID |
|---|---|---|---|---|---|
| 1317777230 | New York NY | Law Firm A | 2006_x | x | 1 |
| 2003738454 | Miami FL | Law Firm B | 2006_x | x | 2 |
| 9108839480 | Sacramento CA | Law Firm C | 2006_x | x | 3 |

FIG. 4(a)

Ⓐ Continues at Ⓑ in FIG. 4(b)

| Timekeeper Name | Budget Type | Start Date | End Date | Rate | Hours | Amount | Phase | Task |
|---|---|---|---|---|---|---|---|---|
| Jane Smith | monthly | 7-Jan-06 | 7-Jun-06 | 300 | 5 | 1500 | B100-Administration | B120-Asset Analysis and Recovery |
| Michael Doe | quarterly | 7-Jan-06 | 31-Mar-06 | 400 | 4 | 1600 | L200-Pretrial Pleadings and Motions | L220-Preliminary Injunctions / Provisional Remedies |
| John Green | project life | 2-Feb-06 | 15-Jul-06 | 250 | 8 | 2000 | L400-Trial Preparation and Trial | L420-Expert Witnesses |

FIG. 4(b)

(B) Continues from (A) in FIG. 4(a)

METHODS AND SYSTEMS FOR CASE BUDGETING AND EXPENSE REDUCTION

PRIORITY APPLICATION

This application claims the benefit of U.S. Provisional Application No. 60/732,867 filed Nov. 2, 2005 entitled "METHODS AND SYSTEMS FOR CASE BUDGETING AND EXPENSE REDUCTION" and incorporated herein by this reference.

FIELD OF THE INVENTION

The present invention relates generally to the field of tools for case budgeting, and more particularly to methods and systems for managing legal fees and costs.

BACKGROUND OF THE INVENTION

There is a current need for a case budgeting tool as a way to control legal expenses incurred, for example, by organizations that find it necessary to employ external legal counsel from time-to-time in addition to their own regularly employed internal counsel. Such a case budgeting tool should enable the making of decisions that are better informed on the part of the organization's internal lawyers, as well as its external lawyers, in developing strategies and making better cost/benefit analyses, for example, by reducing various factors to writing and allowing analysis of those factors. In addition, such a case budgeting tool should reduce external counsel fees and costs, for example, as the result of sharing such reduction to writing for discussion and agreement on various objectives between the organization's internal and external counsel. Additionally, such a case budgeting tool should allow for better decisions by internal counsel and/or business people.

Further, such a case budgeting tool should involve a periodic review, such as monthly, every two months, or quarterly, as well as a reconciliation process to help control external legal costs and build a dialogue between the organization's external and internal counsel regarding, for example, budgeting decisions and follow-through on such decisions. Typically, external counsel furnish only generalized budgets which simply break matters, such as litigation, into different stages. For example, an external firm's typical litigation budget may estimate the cost of phases, such as pre-trial, trial, and post-trial phases or particular aspects of those phases, such as discovery and motions. There is a current need for a breakdown of such costs on a month-by-month basis, looking forward to a quarter, to enable the organization's financial controllers to appropriately budget and forecast external counsel fees and costs and to compare those forecasts with actual fees and costs.

SUMMARY OF THE INVENTION

It is a feature and advantage of the present invention to provide an effective case budgeting tool that enables improved decision making, for example, in developing a case strategy by compelling outside counsel to consider and set case objectives that can be discussed and agreed upon in advance by outside and internal counsel, in making intelligent cost/benefit judgments on case handling, in laying a realistic foundation for cost/benefit analysis for consideration of settlement of a case, and in effectively deploying case resources.

It is a further feature and advantage of the present invention to provide a case budgeting tool that allows an organization to contain outside legal fees and costs by enabling improved decision making that results in lower fees and costs and that also allows efficient decision making through cost/benefit decisions.

To achieve the stated and other features, advantages and objects, embodiments of the present invention employ computer hardware and software, including, without limitation, instructions embodied in program code encoded on machine readable medium, to provide methods and systems for managing legal fees and costs in which, on a periodic basis, external counsel enters case budget information, such as an identification and billing rate (including any discounts) for each person who will be working on a particular case, as well as a brief description and number of hours for each task on which each person will be working during the period. It is to be understood that the term 'costs' includes, without limitation, all disbursements and expense advances of any type for or on behalf of the organization in connection with a particular case. After agreement between external and internal counsel, for example, on personnel, tasks, rates and hours, the case budget information is uploaded to an internal matter management system of the organization. Thereafter, at the end of each billing cycle, external counsel is required to run a comparison of its current bill against the case budget information, and the current bill data is also uploaded to the organization's matter management system, which likewise performs a reconciliation with the stored case budget information and generates a report in which any discrepancies are flagged for discussion between internal and external counsel and adjustment of the bill if necessary.

Methods and systems for managing legal fees and costs for embodiments of the invention involve, for example, periodically receiving case budget information for a pre-determined period of time consisting at least in part of identification and billing rate for each person projected to work on a legal project for an organization and uploading the case budget information to an internal matter management system of the organization. Thereafter, at the end of each billing cycle, current bill data from external counsel is uploaded to the internal matter management system of the organization and compared with the case budget information. According to web-based embodiments of the invention, the case budget information is entered at a computing device by external counsel on a template provided by the organization, for example, in response to prompts displayed at the computing device by a server of the organization via a proprietary network or a public network, such as the Internet. According to other web-based embodiments of the invention, external counsel at the computing device may be allowed to access input functionality of a budgeting tool of the organization via a proprietary network or a public network, such as the Internet and prompted to enter the case budget information on a spreadsheet that encodes with the input functionality.

The case budget information for embodiments of the invention can be received from external counsel for any type of legal project for the organization, including without limitation, litigation projects, merger projects, acquisition projects, intellectual property projects, or real estate projects. Further, receipt of the case budget information from external counsel also involves external counsel's agreement to commit to having only the identified persons work on the legal project. The case budget information for embodiments of the invention includes identification and rate, as well as a title, for each person projected to work on the project, whether or not such persons are employees of external counsel. The case budget information for embodiments of the invention also includes, for example, a description and number of hours for each task of the legal project on which each person is projected to be working. In addition, the case budget tool for embodiments of the invention allows, for example, for the totaling of hours and monies on monthly, individual, task and life of matter.

According to embodiments of the invention, the case budget information is uploaded to the internal matter management system of the organization if approved by internal counsel for the organization. Further, changes in the case budget information are allowed only with prior approval of internal counsel for the organization. Internal counsel may approve a change in the case budget information, for example, if an unanticipated event occurs. Uploading the case budget information for embodiments of the invention also involves, for example, summarizing a total projected cost and total projected hours for a predetermined period of time for each person projected to work on the legal project. In embodiments of the invention, external counsel at a computing device may be allowed to access a server via a network with predefined access rights and input the case budget information on an application that displays a screen for external counsel and prompts external counsel for entry of the budget information into fields displayed on the screen.

The current bill data that is uploaded at the end of each billing cycle for embodiment of the invention consists, for example, of bill data details such as identification, billing rate, task, and hours for each person who worked on the legal project for the organization during a period of time covered by the current bill data. Embodiments of the invention also require external counsel, for example, to run a comparison of the current bill data details with the case budget information and to report any discrepancies between the current bill data details and the case budget information to internal counsel for discussion. In embodiments of the invention, the current bill data can be received electronically from external counsel.

Comparing the current bill data with the case budget information according to embodiments of the invention involves, for example, comparing current bill data details such as identification, billing rate, task, and hours for each person who worked on the legal project during a period of time covered by the current bill data with the case budget information. According to embodiments of the invention, if a discrepancy exists between the current bill data details and the case budget information an invoice based on the current bill data is rejected or flagged for further discussion. Comparing the current bill data with the case budget information according to embodiments of the invention further involves, for example, generating a report in which any discrepancies between the current bill data details, such as the billing rate or number of hours for any person projected to work on the legal project and the case budget information, are flagged. In embodiments of the invention, the current bill date can be compared in electronic form with the case budget information.

Additional objects, advantages and novel features of the invention will be set forth in part in the description which follows, and in part will become more apparent to those skilled in the art upon examination of the following, or may be learned from practice of the invention.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations that come within the scope of the invention.

Figure 1:
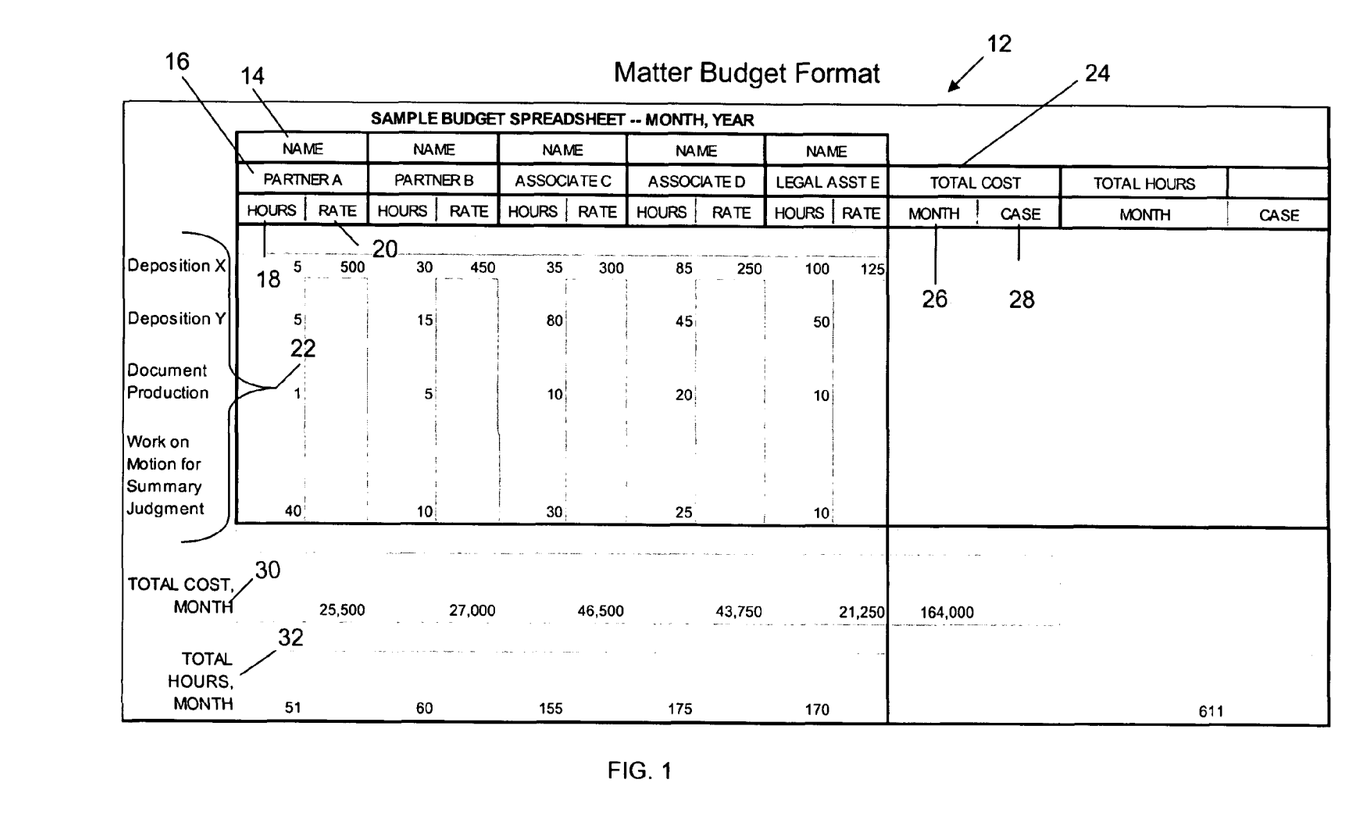
FIG. 1 is an example of a template 12 for receiving entry of information relating to legal fees and costs for embodiments of the invention.

FIG. 1 is an example of a template 12 for receiving entry of information relating to legal fees and costs for embodiments of the invention. Referring to FIG. 1, the template 12 for embodiments of the invention includes, for example, fields for entering names 14, titles 16, hours 18, rates 20, and tasks 22. A first element of the template 12 requires an organization's external counsel to identify those employees who will work on a particular project or matter by entering their names in the names field 14. While the example template 12 illustrated in FIG. 1 is designed for use in litigation matters, it is to be understood that the case budgeting tool for embodiments of the invention can be employed in all types of legal matters including, without limitation, mergers and acquisitions, intellectual property, and real estate matters. In any event, the first element or component of the template 12 prompts the external counsel to enter the names of the people who will work on a particular matter in the names field 14.

An objective of the first component for embodiments of the invention is to promote economic efficiency, especially with certain external law firms which tend to rotate various people into projects, and after posting a few hours, to rotate them off the project. Thus, the first element basically asks external firms to commit and solidify those people who will work on the organization's cases by entering their names in the names field 14. In embodiments of the invention, the first element also relates to policies and procedures established by an organization for its outside legal counsel under which, for example, a change in case staffing by external counsel requires the prior approval of internal counsel. In addition to requiring outside firms to identify the people within the firm who will work on a particular matter, the first element for embodiments of the invention also requires outside firms to identify non-firm personnel by likewise entering their name in the names field 14, such as expert witnesses, who will work on a particular matter.

According to embodiments of the invention, requiring external counsel to identify the people who will work on a particular matter, in addition to each person's title within the outside firm by entering the position in the titles field 16, allows internal counsel of an organization to better control and monitor staffing and trends. Thus, when a bill is received from external counsel, the organization can determine whether new people were added or substituted in a case without its prior approval. This allows internal counsel a degree of leverage over the external counsel and also allows external firms, for example, as a reconciliation measure before a bill goes out, to confirm whether they have met their commitment to the organization with respect to having specifically named persons working on a matter and to address any discrepancies before sending the bill.

Referring again to FIG. 1, another element or component of embodiments of the invention requires external counsel to enter the rates that will be charged in a particular matter in the rates field 16. In embodiments of the invention, the organization adopts policies and procedures whereby, instead of submission and approval of general rates, the organization requires external firms to submit separate rates for each individual attorney, paralegal, or other billing professional for approval, for example, by the organization's general counsel. Under such policies and procedures, once approved, the rates cannot be modified until the proposed modification is likewise submitted and approved by the organization. The approved billing rates are loaded into a case matter management system of the organization and can also be posted on a website by or on behalf of the organization for reference in auditing bills received from the external firm. Thus, even though an external firm's bill is within a budgeted amount, if one or more billing rates used in computing the bill exceed the approved billing rates, the bill may be rejected in an audit check.

In embodiments of the invention, when an external firm's invoice is submitted to the organization, details of time, rate and personnel from the invoice are entered into the organization's matter management system, and a check is performed against the names of approved personnel and their rates, and if a discrepancy is found, the bill is rejected or flagged for further discussion. In this regard, embodiments of the invention include, for example, a case budgeting function of the organization's matter management system which allows input of the template into the matter management system once the completed template is received from the external law firm. Thereafter, as invoices are received periodically from the law firm, they are automatically reconciled against the template information by the matter management system. In addition, the external firm is asked to perform its own audit independently, and any discrepancies or other billing issues can be the subject of discussion between internal and external counsel.

An aspect of the present invention involves, for example, limiting the number of external law firms that are approved for legal work by the organization, which are then listed on an internal website of the organization. As a corollary to limiting the number of external law firms, the volume of work available for assignment to those firms by the organization is increased, thereby improving the organization's leverage in negotiating better rates and deeper discounts. This aspect, in addition to the process of approving separate rates for individual lawyers and other professionals affords the organization a greater degree of control over the approval of rate or personnel changes and rejects any concept or notion of "automatic" rate increases by an external firm.

Obviously, even though the people and their individual rates for a particular matter are approved, unless the number of hours that each person will work on a particular matter at the approved rate is also established, the organization has no control over the bottom line. Accordingly, referring once more to FIG. 1, another element or component of embodiments of the invention requires external counsel to enter a particular task in the task field 22 and the number of hours that will be worked by each person in the particular matter in the hours field 18. This component requires external firms to focus on the cost of a particular aspect of a matter, such as a motion, and input a corresponding number of hours at the approved rate for that aspect. Thus, the cost of the motion is agreed upon, and the particular person who does the work knows the amount of time allotted for the work. If the allotted time is exceeded, it may raise an issue of inefficiency with which the external firm must deal, but the excess cannot be passed on to the organization.

An embodiment of the invention is employed in conjunction with an implementation of electronic-billing with functionality that allows automatic entry of policies and procedures including, for example, controls on what the organization deems to be appropriate reimbursable disbursements. The electronic-billing function provides a check for appropriate reimbursable disbursements, as well as approved rates, personnel, and hours and also integrates a case budgeting feature for embodiments of the invention. The electronic-billing function is able to automatically scrub bills for reimbursable disbursements, as well as for approved rates, personnel, and hours and to flag inappropriate items for discussion and thus relieves the organization's internal counsel and/or finance staff of the burden and cost of reviewing line items of multiple legal bills periodically.

An important aspect of embodiments of the invention is its effectiveness as a tool for developing strategy. Thus, while an organization may not ordinarily pay external counsel for merely furnishing a case budget assessment, the organization can offer to pay external firms for time involved in filling the template for embodiments of the invention because filling the template compels external firms to determine an appropriate strategy to pursue in a particular case and to forecast objectives and procedures employed to conduct the case, for example, over a succeeding three-months period. In turn, this enables the organization's internal counsel to consider whether or not the proposed strategy makes economic sense.

For example, assume that the external firm's proposed strategy involves a motion to dismiss, discovery, and a motion for summary judgment. Internal counsel can review the line items furnished by the external firm in terms of personnel, rates and hours to determine the projected cost of the proposed strategy and make an informed decision as to whether or not to pursue the proposed strategy or some aspect of the proposed strategy. If, for example, the proposed cost of a particular aspect of the proposed strategy is high and the likelihood of success is low, a cost/benefits analysis allows internal counsel to make a strategic decision not to pursue the particular aspect.

Referring once again to the example template shown in FIG. 1, another element or component of the invention requires external counsel to enter all of the different phases or events on which particular people will be working in the task field 22. Thus, instead of a vague listing of generalized categories, such as depositions, the outside firm must specify exactly what person will work on which particular deposition. This likewise helps internal counsel in making an evaluation of whether those items are worth pursuing. In other words, not only is the outside firm required to input the specific phases or events that are proposed for a case, but it must also input the identities of its proposed team members and their specific assignments, rates and hours.

Based on the proposed number of hours at the approved rate(s), in embodiments of the invention, total projected costs 24 are computed for each task, for example, for a current month 26, as well as for the year-to-date 28. This computation enables the organization to evaluate whether or not the proper people in the outside firm are performing particular tasks and, for example, whether a more senior person or a more junior person could handle tasks more efficiently and less expensively. It also enables the organization to see whether or not the external firm is overstaffing or understaffing a matter and, for example, whether less people or perhaps more people could handle tasks more efficiently.

Further, embodiments of the invention summarize cost 30 and hours 32 by person, month 26 and case 28. The summarizing function enables the organization to consider, for example, whether or not work load is distributed properly, what the cost per lawyer is, and how much time and money is expected to be spent in the current month. In addition, the summarizing function enables the organization to target, for example, the reason for taking an unusually long time to complete a particular task. Importantly, the summarizing function enables the organization to look at how much time and money have been invested in a case and how much more time and money are expected to be invested in the case in the future and factor that information into settlement strategies.

An aspect of embodiments of the invention involves establishing a threshold amount of costs and fees, such as one million dollars, for mandating its use in a particular case and making its use discretionary below that amount. Of course, the threshold amount can be higher or lower. However, regardless of the threshold amount, either or both of the internal counsel and the external counsel may decide that the advantages of using the budgeting tool for embodiments of the invention are such that it should be used in a particular case. When internal counsel identifies a case for which employment of the case budgeting tool is deemed appropriate, internal counsel communicates this to external counsel, and an agreement is reached for its use.

When an agreement is reached for use of the budgeting tool for embodiments of the invention and the outside lawyer has received training in its use, the outside lawyer is allowed to access input functionality of the budgeting tool and prompted to enter budget information, such as anticipated tasks, people, hours and rates for a three-month period, for example, on a spreadsheet that encodes with the functionality. For an ongoing case, the outside lawyer may be requested to enter the budget information, for example, in mid-month, such as mid-September, for the succeeding three months, such as October, November, and December.

Figure 2:
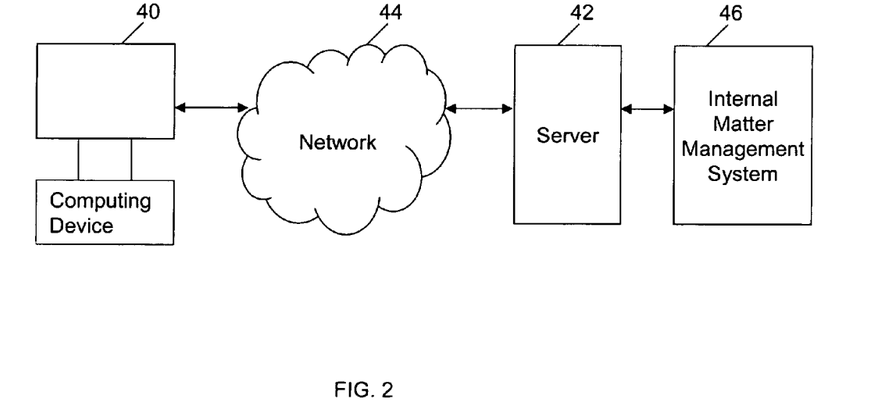
FIG. 2 is a schematic diagram that shows an example of certain components of an embodiment of the invention.

FIG. 2 is a schematic diagram that shows an example of certain components of an embodiment of the invention. In embodiments of the invention, external counsel at a computing device 40, such as a desktop computer, can access one or more servers, including without limitation a secure server 42, via a network 44 (which can be a proprietary network or a public network, such as the Internet) or other electronic communication means and input the budget information on an application, for example, which displays a screen for the external counsel at the computing device 40 that prompts the external counsel for entry of the budget information into the various fields displayed on the screen. In further embodiments of the invention, the budget information may be input in this manner directly into the organization's case management system. In additional embodiments of the invention, external counsel may have certain case-specific administrative rights to access particular data and read-only rights with respect to other data.

In entering the budget information, the outside lawyer will consider, for example, a strategy, a team, and the nature of events that are likely to have to be addressed. Thereafter, the lawyer in charge of the case for the outside firm, in consultation with his team, can identify tasks that are expected be performed in the succeeding three months, identify persons who will perform those tasks, and determine the associated hours and rates. The appropriate budget information can then be entered and carefully reviewed by the outside firm, and if everything appears to be in order, the budget information is sent, for example, electronically to the organization.

Upon receipt of the budget information by the organization, in an embodiment of the invention, an internal lawyer reviews the budget and shares it, for example, with the relevant business client within the organization. If any discrepancies, problems, or issues are uncovered by the internal lawyer or business client, they are addressed and resolved with the external counsel and an agreement is reached with the external counsel, for example, on a case plan, staffing issues, and goals and objectives for the forthcoming quarter. An aspect of embodiments of the invention also involves sending the agreed budget to the business client which is accomplished, for example, by electronically inserting the budget information into a case budgeting notebook of an internal matter management system 46 of the organization.

Once the budget information is input and made available to the organization's finance department, embodiments of the invention enable a dialogue between internal and external counsel in the event, for example, of a proposed modification of the budget during the current budget period. For example, if an unanticipated event occurs, such as a new motion, a court-ordered hearing or a stay, that impacts the budget for the current period, the external lawyer immediately advises the internal lawyer and enters new budget information for approval and agreement. When agreed upon, the new budget information is likewise sent to the organization's finance department and input into the organization's matter management system 46.

When an invoice is received from the external law firm, it is sent, for example, to the internal counsel for review and approval. In an embodiment of the invention, internal counsel has a number of options. In one option, the internal lawyer can review, for example, a paper invoice against the budget information previously input into the organization's matter management system 46 to determine whether or not there are discrepancies and approve or reject the invoice or discuss any modifications or changes with outside counsel. For another option, the invoice data can be input into the organization's matter management system 46, which performs a comparison with the budget information previously entered and generates a report as to whether or not there is a variance, for example, between projected hours and approved rates. In addition, in embodiments of the invention, the matter management system 46 can feed into a financial control system of the organization.

In an embodiment of the invention, the matter management system 46 compares the invoice with the previously input budget information with regard, for example, to outside law firm name and its employees' names and billing rates. If someone is added to a case or if a person's rate is different, the matter management system 46 flags the discrepancy and/or may allow processing of invoice items which conform to the approved budget information for payment. Further, even if internal counsel reviews and approves an invoice, until and unless the invoice is run through the audit process of the matter management system and no discrepancies are flagged, the matter management system 46 will not allow the invoice to be processed for payment. If an invoice is received in electronic form, the matter management system 46 likewise compares the electronic invoice with the budget information previously entered and generates the report as to whether or not a discrepancy exists and flags any discrepancy.

Periodically, for example, at the end of a quarter (or a shorter period if appropriate in a particular case), an embodiment of the invention involves a reconciliation between the total of all invoices received from the external firm during the quarter and the budget information previously entered for the quarter. In an embodiment of the invention, the reconciliation is performed internally by the organization, and in addition, the outside law firm is also required to perform a reconciliation and submit it to the organization.

An important aspect of embodiments of the invention is the reconciliation process, in which, for example, undervaluations as well as overages in anticipated hours spent are uncovered. For example, if the total bills for a quarter are less than anticipated by the budget information for the quarter, the reason could be that the external firm is more efficient than anticipated, but it could also be that an anticipated event was postponed, for example, to a succeeding quarter. In the latter case, the fees and costs for the postponed event will fall into the succeeding quarter and will thus be included in the budget information for that quarter. Thus, the budget tool for embodiments of the invention enables a dialogue between internal and external counsel with respect, for example, to objectives, performance, and new and upcoming events. It provides both a performance check and a strategy check, as well as an opportunity for discussion between internal and external counsel of aspects of the case, such as where the case is now and where is it is heading and the wisdom of continuing to fight, exploring settlement, or considering alternative routes.

As previously noted, in embodiments of the invention, the reconciliation process is typically performed at the end of a current quarter at a time after the succeeding quarter has already begun. However, since the outside law firm's billing for a particular month ordinarily occurs well into the following month, the performance of the reconciliation process after the quarter closes allows plenty of time for discussion between internal and external counsel of any necessary adjustments to the bill. Further, in addition to its other advantages, employment of the budgeting tool for embodiments of the invention may encourage outside firms to explore replacing hourly billing with alternative billing structures, such as a fixed fee arrangement for a particular matter payable, for example, in a lump sum at the end of the matter or in periodic installments over the life of the matter and/or electronic auction for legal services.

Figure 3:
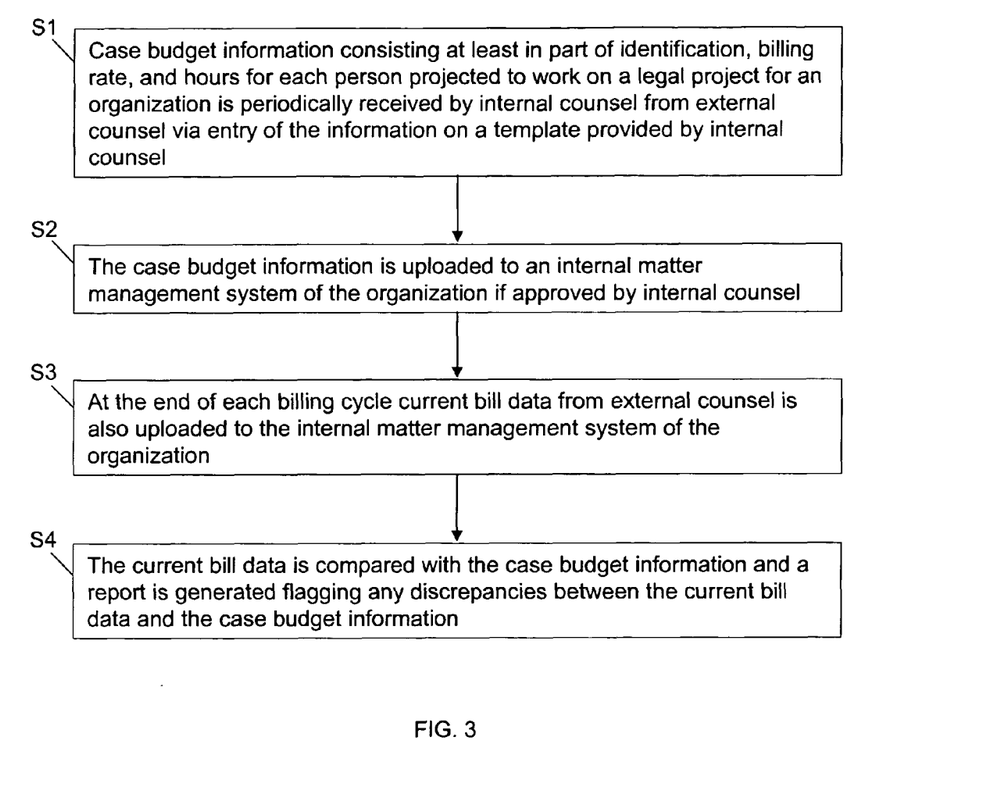
FIG. 3 is a flow chart that illustrates an example of the process of managing legal fees and costs of an organization for embodiments of the invention.

FIG. 3 is a flow chart that illustrates an example of the process of managing legal fees and costs of an organization for embodiments of the invention. Referring to FIG. 3, at S1, case budget information consisting at least in part of identification, billing rate, and hours for each person projected to work on a legal project for an organization is periodically received by internal counsel from external counsel via entry of the information on a template provided by internal counsel, and at S2, the case budget information is uploaded to an internal matter management system of the organization if approved by internal counsel. At S3, at the end of each billing cycle, current bill data from external counsel is also uploaded to the internal matter management system of the organization, and at S4, the current bill data is compared with the case budget information and a report is generated flagging any discrepancies between the current bill data and the case budget information Embodiments of the invention can be implemented as processes of a computer program product; each process of which is operable on one or more processors either alone on a single physical platform, such as a personal computer, or across a plurality of platforms, such as a system or network, including networks such as the Internet. Such a system can comprise multiple client devices in communication with one or more server devices over a network. In one embodiment, the network comprises the Internet. In other embodiments, other networks, such as an intranet, WAN, LAN, or cellular network may be used. In yet other embodiments, other suitable networks may be used.

The client devices each comprises a computer-readable medium, such as a random access memory (RAM) coupled to a processor. The processor executes computer-executable program instructions stored in memory. Such processors may comprise a microprocessor, an ASIC, and state machines. Such processors comprise, or may be in communication with, media, such as computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor of the client, with computer-readable instructions.

Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other suitable medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

The client devices may also comprise a number of external or internal devices such as a mouse, a CD-ROM, DVD, a keyboard, a display, or other input or output devices. In general, a client device may be any suitable type of processor-based platform that is connected to a network and that interacts with one or more application programs. Client devices may operate on any suitable operating system, such as Microsoft® Windows® or Linux.

Server devices are also coupled to the network. Similar to the client devices, the server devices comprise a processor coupled to a computer-readable medium, such as a random access memory (RAM). The server device, which can be a single computer system, may also be implemented as a network of computer processors. Examples of a server device are servers, mainframe computers, networked computers, a processor-based device, and similar types of systems and devices.

Client processor and the server processor can be any of suitable number of computer processors, such as processors from Intel Corporation of Santa Clara, Calif. and Motorola Corporation of Schaumburg, Ill. Alternatively, methods according to the present invention may operate within a single computer. An embodiment such as the one described above could be implemented as a decision engine which may be largely automated and collect data on the accounts from multiple sources.

Figure 4A:
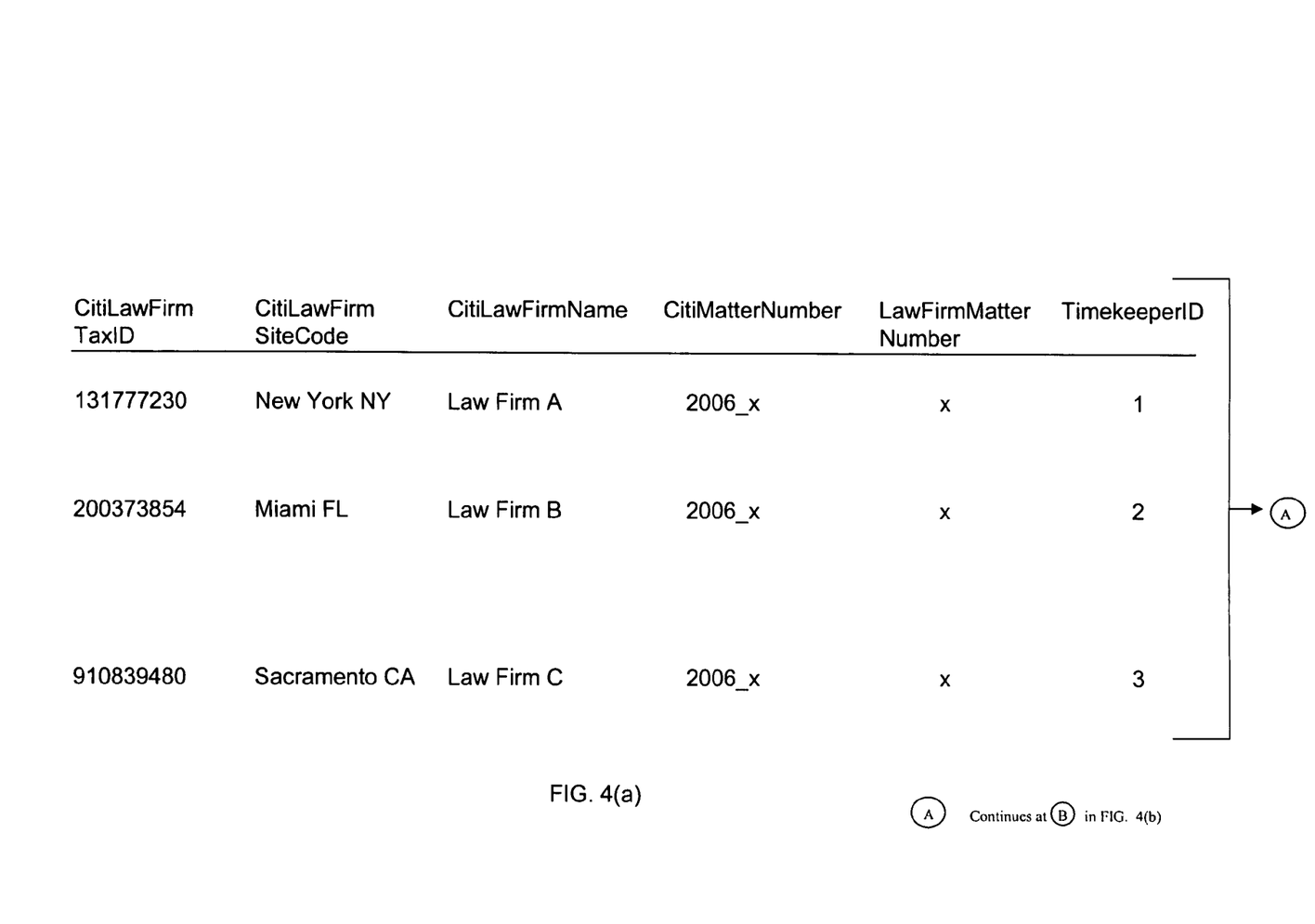
FIGS. 4(a) and 4(b) show an example of budget data elements imported electronically by the organization from external counsel for embodiments of the invention.
Figure 4B:
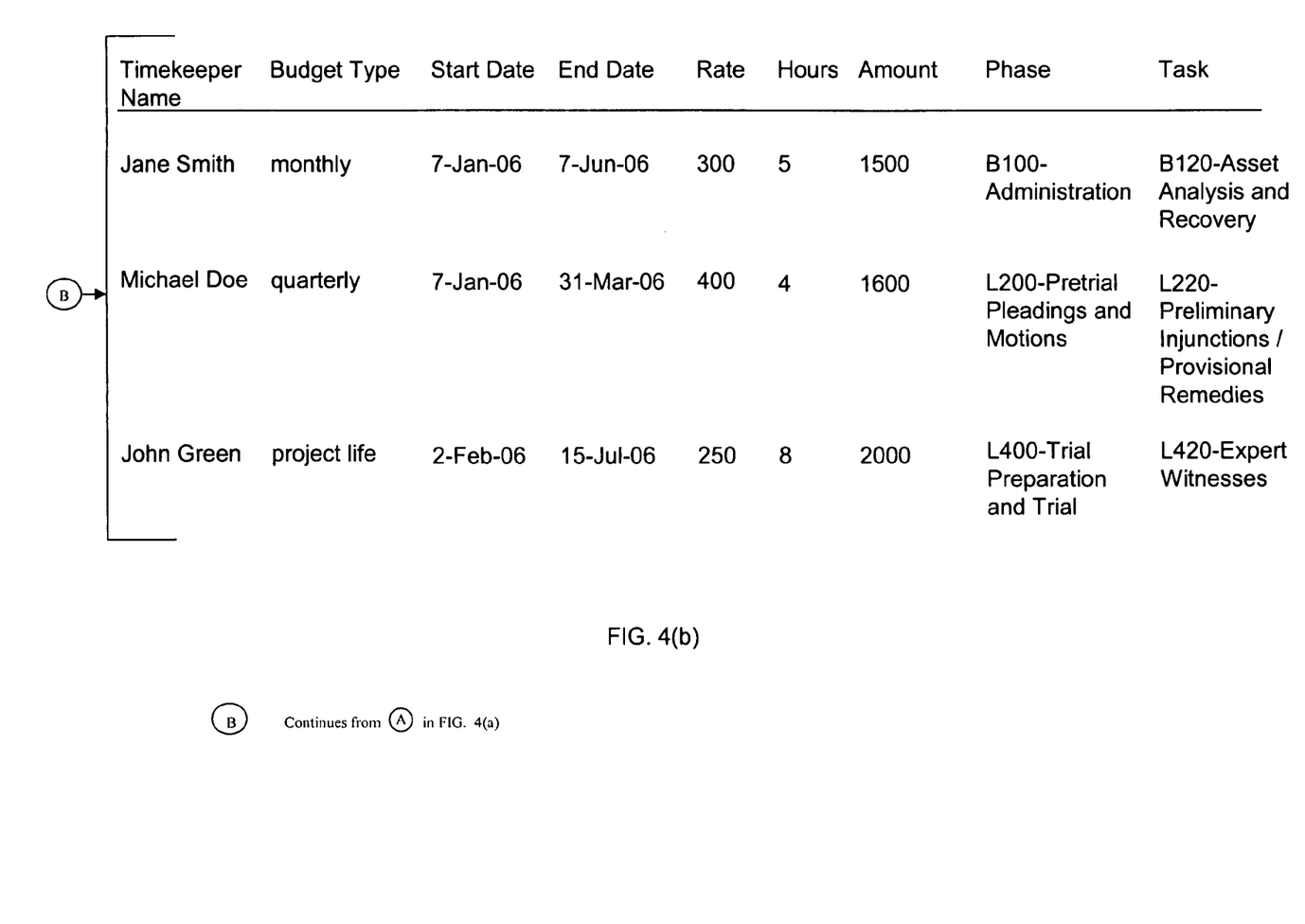

FIGS. 4(a) and 4(b) show an example of budget data elements imported electronically by the organization from external counsel for embodiments of the invention. The process of case budgeting for embodiments of the invention involves monitoring costs and budget. For example, the organization's in-house supervising attorney is responsible for monitoring and managing the fees and expenses charged to a matter, and a matter's budget if one has been set.

In embodiments of the invention, at the start of any new matter requiring a budget to be set, the in-house supervising attorney should review and discuss the budget submitted by outside counsel to ensure it is appropriate to the scope and risks presented by the matter. Any discrepancies should be discussed with outside counsel before it is approved. As the matter proceeds, the in-house supervising attorney is responsible for reviewing, revisiting and modifying the matter's budget as appropriate against submitted fees and expenses, for managing any billing discrepancies, and discussing any disagreements on staffing or allocation.

Embodiments of the invention may require that a budget be set for certain matters according to predefined parameters. For example, the in-house supervising attorney may be required to set a budget for any matter for which the fees and expenses are expected to equal or exceed a predetermined sum, such as $250,000. In that case, if a matter does not have a budget, and fees and expenses reach $250,000 during the life of a matter, the in-house supervising attorney will be notified by email that a budget is required on that matter.

When a new matter is set up in the system for embodiments of the invention, by the in-house supervising attorney or designee, a system-generated email will be forwarded to the selected outside counsel to inform him/her that a new case has been assigned. Outside counsel will have the option to set up a budget in the organization's matter management system 46 at that time or within 30 days if the cost of the matter is expected to equal or exceed the predetermined sum, such as $250,000. All other matters will require budgets once the predetermined matter eligibility threshold is met, as outlined below.

In one aspect of embodiments of the invention, law firms will establish budgets on organization matters by completing a standard template that the organization provides. The completed budget template is then submitted by the law firm to a pre-defined email address provided to all approved firms during training. In a web-enabled aspect of embodiments of the invention, law firms will access a restricted access web portal to complete and submit a budget template. Upon submission of a new or revised budget, a system-generated email will go to the in-house supervising attorney advising that a budget has been received for his/her review.

In a budget adjustment aspect of embodiments of the invention, matter budget updates are required on a quarterly basis, or monthly if changes occur that should be reflected immediately as deemed appropriate by in-house supervising attorney and outside counsel. The law firms will submit a new budget template that will inactivate the previous budget on record. At that time a system-generated email will go to the in-house supervising attorney, as described above.

In a system and process controls aspect for embodiments of the invention, when a matter is set up in organization's matter management system 46, the system will track the legal fees and costs paid on the matter and once a predetermined aggregate threshold, such as $250,000 has been reached, a system-generated email will be triggered to inform the in-house supervising attorney that a matter budget is required. At that time, it is imperative that an action be taken to establish a budget.

Every time an invoice is presented for payment after predetermined threshold is met, the system for embodiments of the invention will check the existence of a budget. If there is no budget established, the system will continue to auto-generate the notification emails until the appropriate action is taken. The invoice(s) will be held until there is a matter budget in place, at which time the invoice(s) will be paid. Additionally, there will be reporting controls to facilitate the identification of matters that meet the predefined case budgeting policy matter eligibility criteria but do not have a budget in the system. Other budget-related reports are also available in organization's matter management system 46 on a self-service basis.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A computer-implemented method for managing legal fees and costs, comprising:

periodically receiving external counsel's entry at a computing device coupled to a server via a network of case budget information on a spreadsheet that encodes with input functionality of budgeting tool of the organization, the case budget information consisting at least in part of a projected cost and an identification, billing rate, status as employee or non-employee of external counsel, title, and description and number of hours for each task for each of a plurality of persons projected to work on a legal project for the organization during a predetermined period of time;

uploading the case budget information received from external counsel to an internal matter management system of the organization;

uploading current bill data received form external counsel consisting at least in part of a current billed amount and an identification, billing rate, status as employee or non-employee of external counsel, title, and description and number of hours for each task for each person who worked on the legal project during a period of time covered by the current bill data received from external counsel to the internal matter management system of the organization at the end of each billing cycle;

comparing the uploaded current bill data with the uploaded case budget information by the internal matter management system and flagging any discrepancy; and determining, by the computer, that an invoice includes a billing rate for any one of the plurality of persons projected to work on the legal project that is used in computing the current billed amounts exceeds the billing rate for said one of the plurality of persons included in the case budget information for said person, rejecting the invoice based on the determining step.

2. The method of claim 1, wherein periodically receiving the case budget information further comprises periodically receiving the case budget information for a pre-determined succeeding period of time.

3. The method of claim 1, wherein receiving the case budget information further comprises receiving external counsel's entry of the case budget information on a template provided by the organization.

4. The method of claim 3, wherein receiving external counsel's entry of the case budget information further comprises prompting external counsel to enter the case budget information on the template.

5. The method of claim 4, wherein prompting external counsel to enter the case budget information on the template further comprises allowing external counsel to access the input functionality of the budgeting tool of the organization and prompting external counsel to enter the case budget information on the spreadsheet that encodes with the input functionality.

6. The method of claim 1, wherein receiving the case budget information further comprises receiving the case budget information for each person projected to work on any of a litigation project, merger project, acquisitions project, intellectual property project, or real estate project.

7. The method of claim 1, wherein receiving the case budget information further comprises receiving external counsel's agreement to commit to having only the identified persons work on the legal project.

8. The method of claim 1, wherein uploading the case budget information to the internal matter management system further comprises uploading the case budget information to the internal matter management system of the organization if approved by internal counsel for the organization.

9. The method of claim 8, wherein uploading the case budget information if approved by internal counsel for the organization further comprises allowing a change in the case budget information by external counsel only with prior approval of internal counsel for the organization.

10. The method of claim 8, wherein uploading the case budget information if approved by internal counsel for the organization further comprises allowing a change in the case budget information by external counsel with approval of internal counsel for the organization if an unanticipated event occurs.

11. The method of claim 1, wherein uploading the case budget information to the internal matter management system further comprises summarizing a total projected cost and total projected hours for a predetermined period of time for each person projected to work on the legal project.

12. The method of claim 1, wherein uploading the case budget information to the internal matter management system further comprises allowing external counsel at the computing device to access the server via the network with predefined access rights and input the case budget information on an application that displays a screen for external counsel which prompts external counsel for entry of the budget information into fields displayed on the screen.

13. The method of claim 1, wherein uploading the current bill data details further comprises requiring external counsel to run a comparison of the current bill data details with the case budget information.

14. The method of claim 13, wherein requiring external counsel to run the comparison further comprises requiring external counsel to report any discrepancies between the current bill data details and the case budget information to internal counsel for discussion.

15. The method of claim 1, wherein uploading the current bill data further comprises receiving the current bill data electronically from external counsel.

16. The method of claim 1, wherein comparing the current bill data with the case budget information further comprises rejecting an invoice based on the current bill data if a discrepancy exists between the current bill data details and the case budget information.

17. The method of claim 1, wherein comparing the current bill data with the case budget information further comprises generating a report in which any discrepancies between the current bill data details and the case budget information are flagged.

18. The method of claim 17, wherein generating the report further comprises generating the report flagging any discrepancy in the billing rate for any person projected to work on the legal project.

19. The method of claim 17, wherein generating the report in which any discrepancies between the current bill data details and the case budget information are flagged further comprises generating the report flagging ant discrepancy in the number of hours for any person projected to work on the legal project.

20. The method of claim 1, wherein comparing the current bill data with the case budget information further comprises comparing the current bill data in electronic form with the case budget information.

21. A non-transitory machine-readable medium on which is encoded program code for managing legal fees and costs, the program code comprising instructions for:
periodically receiving external counsel's entry at a computing device coupled to a server via a network of case budget information on a spreadsheet that encodes with input functionality of budgeting tool of the organization, the case budget information consisting at least in part of a projected cost and an identification, billing rate, status as employee or non-employee of external counsel, title, and description and number of hours for each task for each of a plurality of persons projected to work on a legal project for the organization during a predetermined period of time;
uploading the case budget information received from external counsel to an internal matter management system of the organization;
uploading current bill data received form external counsel consisting at least in part of a current billed amount and an identification, billing rate, status as employee or non-employee of external counsel, title, and description and number of hours for each task for each person who worked on the legal project during a period of time covered by the current bill data received from external counsel to the internal matter management system of the organization at the end of each billing cycle;
comparing the uploaded current bill data with the uploaded case budget information by the internal matter management system and flagging any discrepancy; and
determining, by the computer, that an invoice includes a billing rate for any one of the plurality of persons projected to work on the legal project that is used in computing the current billed amounts exceeds the billing rate for said one of the plurality of persons included in the case budget information for said person,
rejecting the invoice based on the determining step.

* * * * *